United States Patent [19]
Herzog

[11] Patent Number: 5,396,712
[45] Date of Patent: Mar. 14, 1995

[54] COORDINATE MEASURING DEVICE
[75] Inventor: Klaus Herzog, Aalen, Germany
[73] Assignee: Carl Zeiss Stiftung, Heidenheim, Germany
[21] Appl. No.: 148,842
[22] Filed: Nov. 5, 1993
[30] Foreign Application Priority Data
Nov. 12, 1992 [DE] Germany .................. 42 38 139.8
[51] Int. Cl.⁶ .............................................. G01B 5/03
[52] U.S. Cl. ........................................ 33/503; 33/502; 33/504; 33/568
[58] Field of Search ................. 33/502, 503, 504, 568, 33/569, 573

[56] References Cited
U.S. PATENT DOCUMENTS

| | | | |
|---|---|---|---|
| 2,753,634 | 7/1956 | Tamplin | 33/503 |
| 4,080,741 | 3/1978 | Siddall et al. | 33/504 |
| 4,703,443 | 10/1987 | Moriyasu | 33/503 |
| 4,731,934 | 3/1988 | Barnaby et al. | 33/504 |
| 4,819,339 | 4/1989 | Kunzmann et al. | 33/503 |
| 4,891,889 | 1/1990 | Tomelleri | 33/503 |
| 4,961,267 | 10/1990 | Herzog | 33/503 |
| 5,134,782 | 8/1992 | Breyer et al. | 33/503 |
| 5,148,377 | 9/1992 | McDonald | 33/503 |
| 5,189,806 | 3/1993 | McMurtry et al. | 33/503 |
| 5,276,974 | 1/1994 | Chanoni et al. | 33/503 |

FOREIGN PATENT DOCUMENTS 3310345 9/1984 Germany .
3419546 11/1985 Germany .

Primary Examiner—Thomas B. Will

[57] ABSTRACT

A manually guided probe of a coordinate measuring device is mounted by two rotary shafts arranged one behind the other and a spring parallelogram for nearly reaction free movement in several spatial directions. The device has a workpiece table that is rotatable and tiltable about at least two shafts.

13 Claims, 3 Drawing Sheets

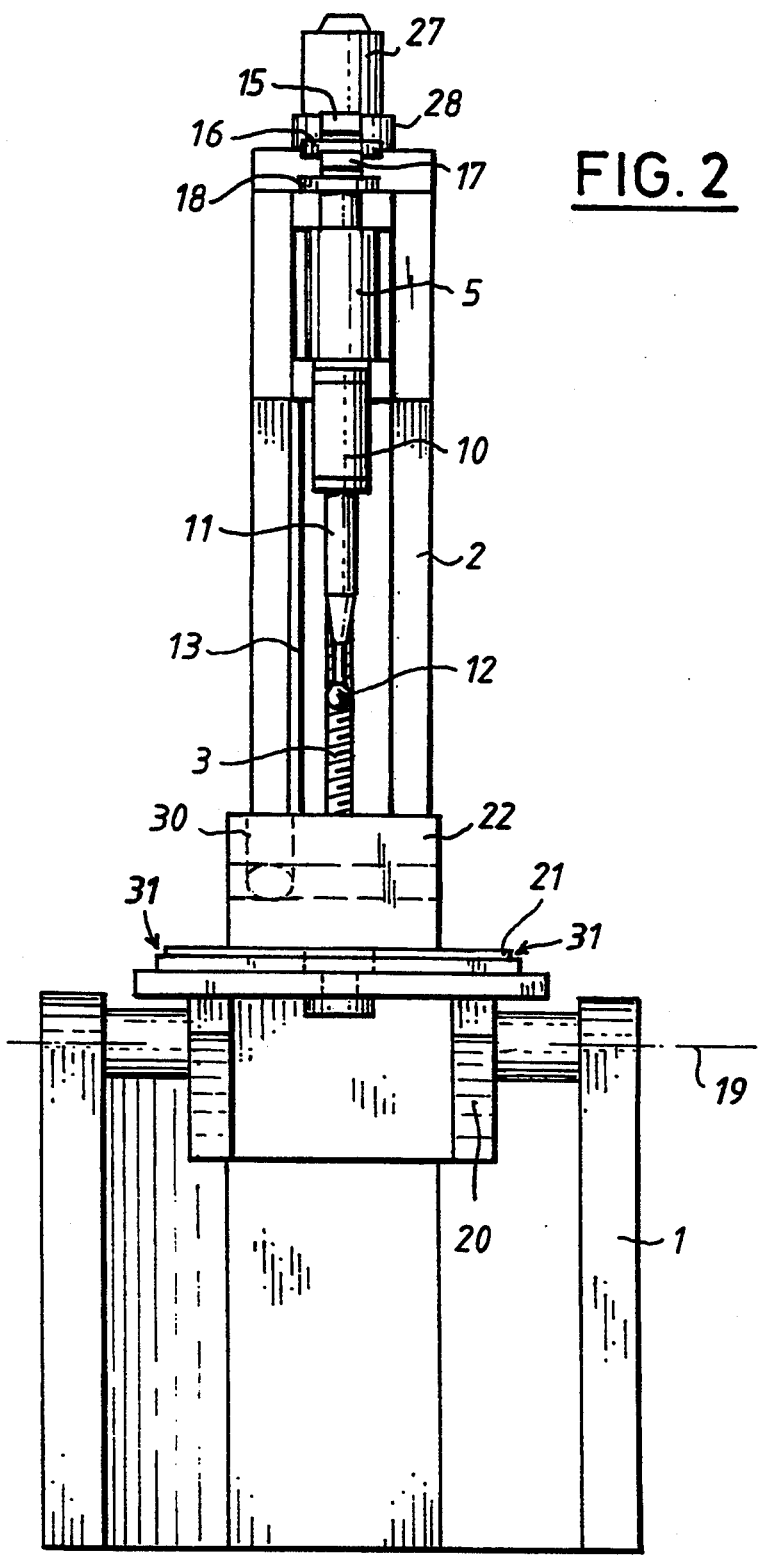
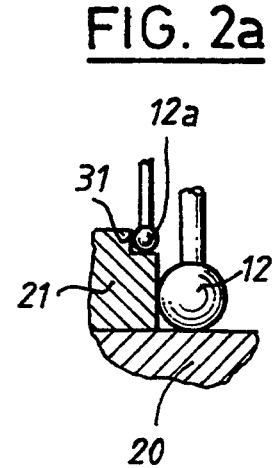

COORDINATE MEASURING DEVICE

BACKGROUND OF THE INVENTION

Coordinate measuring devices are available today in a variety of designs and degrees of automation. Besides CNC controlled devices, which carry out complex measuring programs under automatic control on the most varied workpieces, so-called manual, i.e., unmotorized or only partially motorized, coordinate measuring devices are also in use. In these devices, the operator guides the probe by hand on the locations of the workpiece to be measured.

The last-mentioned devices are mostly air cushion mounted and the moving masses to be guided are minimized as far as possible by a corresponding construction design. The operator nevertheless has to exert considerable forces at times to accelerate and decelerate the measuring slide of the machine in order to overcome inertia. If these forces are introduced in the neighborhood of the probe, a deformation of the machine coordinate system results. This results in measurement errors, which are often large. If, for example, rigid probes are used for the purpose of shape testing in such manually guided coordinate measuring devices, and the probe is caused to travel continuously along a geometrical element, e.g., a surface or the inner wall of a bore, with continuous measurement point transfer, very many measurement points can be sensed very rapidly, without great cost, and very elegantly (e.g., 1,000 points in a bore of 50 mm diameter in 2–3 seconds). However, because of the above-mentioned reaction forces, measurement errors of between 10 $\mu$m and 100 $\mu$m arise, depending on the skill of the operator and the stiffness of the probe.

Attempts have been made to eliminate these errors by having the machine guided, as far as possible, not on the measuring arm or sleeve, but on the cross slide carrying it. However, the arm or sleeve then has to be either motorized or operated with both hands.

The per se very elegant process of surveying the workpiece geometry by scanning with a rigid probe is therefore used today on manually guided coordinate measuring devices only in the measurement of plane curves with low requirements for accuracy.

A coordinate measuring device is described in British Patent 1,498,009. Its probe is mounted, for motion in several spatial directions, on rotation shafts arranged one behind the other. This device involves relative difficulty and entails substantial cost if geometric elements such as bores and surfaces are to be scanned that have their axes of symmetry lying at an angle to the two vertically upright rotation shafts of the device.

SUMMARY OF THE INVENTION

The object of the present invention is to provide a coordinate measuring device that makes possible, in an operation involving manually guided scanning with rigid probes, a measurement accuracy of a few $\mu$m without any special demands on the operator. In addition, the device is to be of simple construction, easy to operate and suitable for the measurement of geometric elements aligned in different directions.

This object is achieved by means of a coordinate measuring device according to the invention, having a probe mounted by means of a plurality of rotary shafts arranged one behind the other to be easily movable in several degrees of freedom and a workpiece table that is rotatable and tiltable about at least two shafts.

Using the new coordinate measuring device according to the invention, a large number of measurement points can be very quickly sensed with good accuracy. The alignment of the axes of symmetry of the geometric elements with the probe axis takes place quickly and simply by means of the rotatable and tiltable workpiece table. The table has centering elements that can be determined by means of the probe alone, without further or additional measuring means.

DESCRIPTION OF THE DRAWINGS

Further features and advantages of the invention will be apparent from the following description of a preferred embodiment, with reference to the accompanying drawings, in which:

FIG. 2 shows the coordinate measuring device of FIG. 1 in a front view;

FIG. 2a shows probes of different diameters.

DETAILED DESCRIPTION OF A PREFERRED EMBODIMENT

Figure 1:
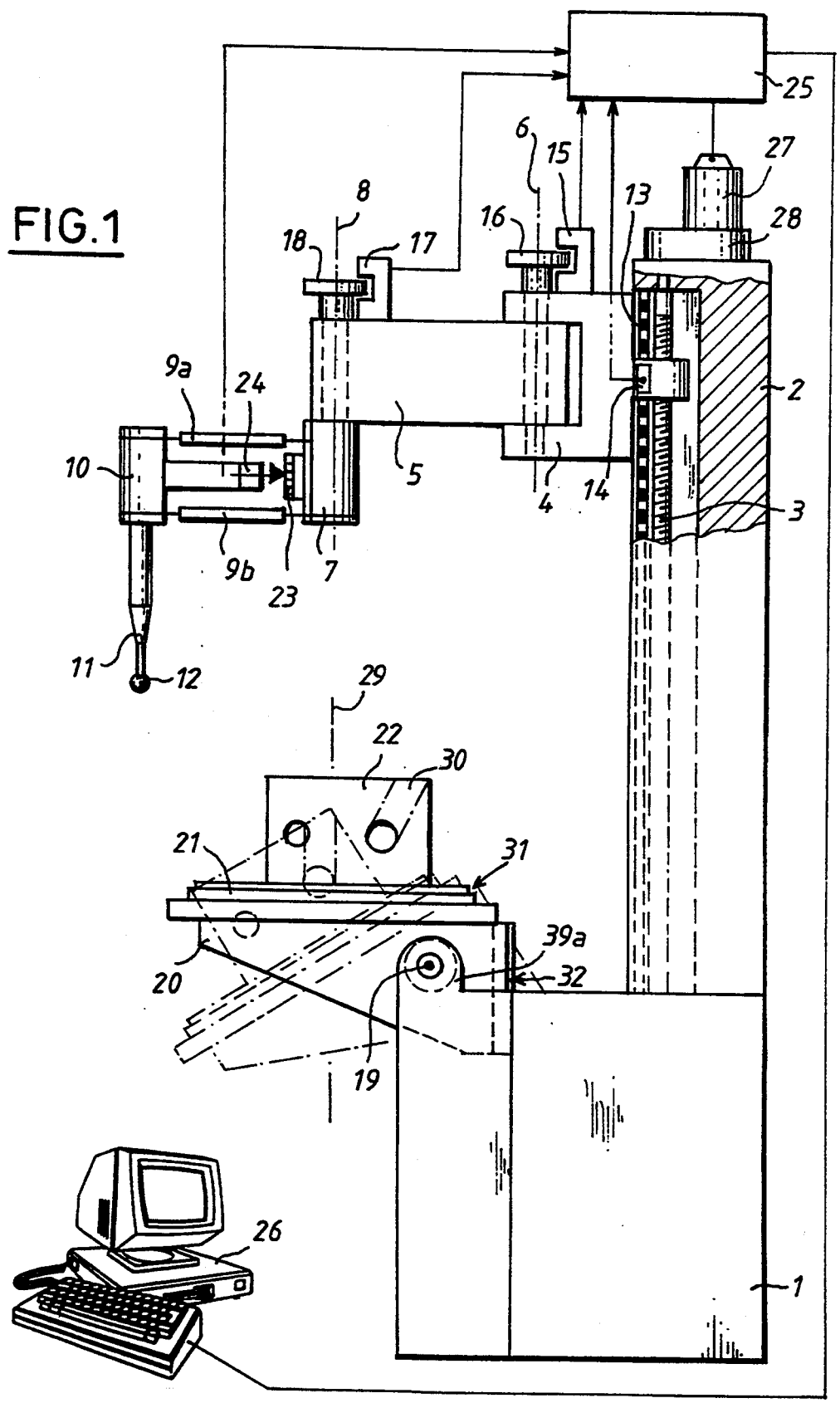
FIG. 1 is a side view of the coordinate measuring device according to the invention.
Figure 3:
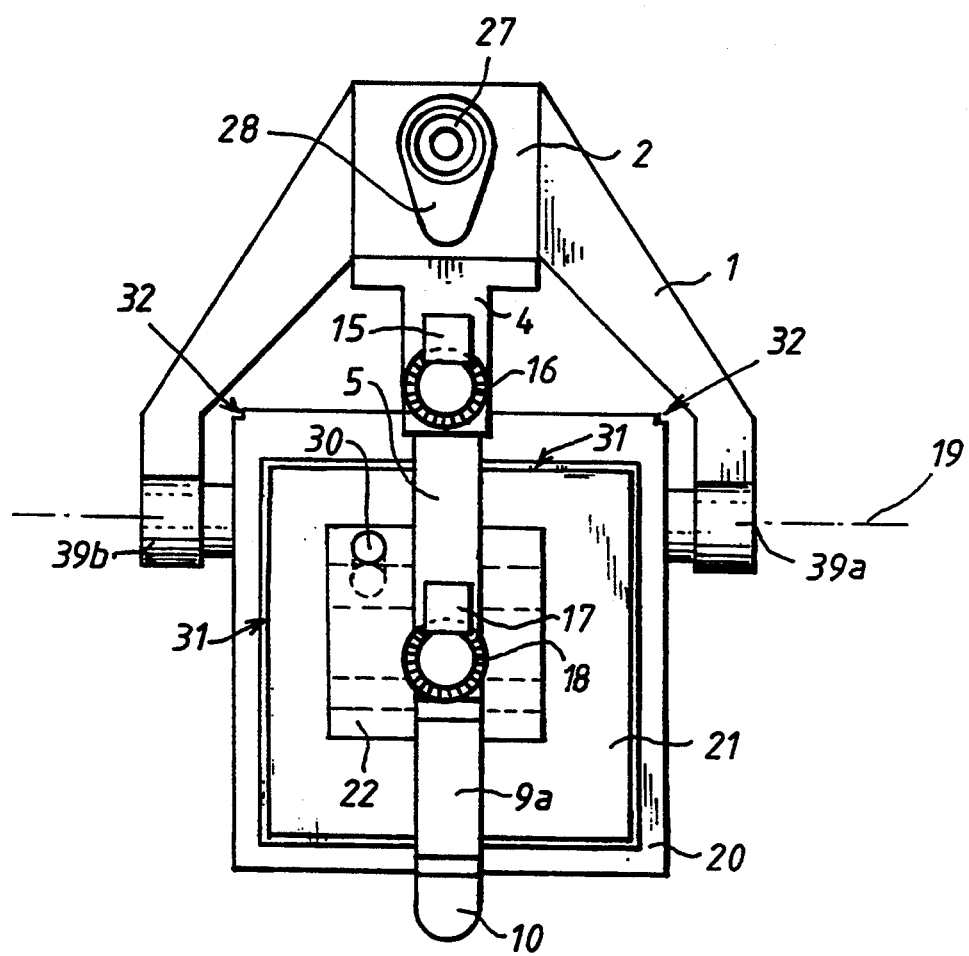
FIG. 3 shows the coordinate measuring device of FIG. 1 in plan view.

The coordinate measuring device shown in the Figures has a base body (1), of a somewhat forked shape in plan view, on which a vertical column (2) stands. The column (2) is constructed as a height measuring device and has a spindle (3) that via a motor (27) and gearing (28), drives a carrier (4), vertically displaceable in the column (2). An incremental scale (13) in the column (3) and a photoelectric reading head (14) on the carrier (4) are provided for the measurement of the vertical position of the carrier (4).

The carrier (4) is U-shaped in side view. The two shanks of the "U" contain bearings for a vertical shaft (6), by means of which a first lever member (5) can be pivoted horizontally. The rotary motion is sensed by a graduated circle (16) fixed to the shaft and a photoelectric transducer system (15). A second lever member (7) is mounted, likewise rotatably, at the end of the lever member (5) by means of a second shaft (8), which is parallel to the vertical shaft (6). A graduated circle (18) in combination with a reading head (17) is used to sense the rotary motion of this second rotary shaft (8). The two rotary shafts (6) and (8) are spaced apart and are aligned approximately vertically.

The second lever member (7) is constructed in the form of a spring parallelogram (9a, 9b), the carrier (10) for a rigid probe (11) being jointed to its front end. The probe (11) is vertically movable with this spring parallelogram (9a, 9b). For the sake of a better overall view, neither the weight equalizing systems by which the spring parallelogram (9a, 9b) is held in horizontal alignment, nor the additional means by which the spring parallelogram can be clamped, e.g., in its middle position, are shown in the drawing. Another kind of linear guiding means can of course be used at this point, instead of the spring parallelogram.

The movable members (5, 7, and 10) are composed of carbon fiber reinforced plastic (CFRP) or invar and hence have a very small mass, with a highly stable structure. At the same time they possess insensitivity to temperature effects.

The deflection of the probe (11) in the vertical direction is sensed by a photoelectric measuring system consisting of a scale (23) and a reading head (24), the system being shown in a simplified manner in the Figures. However, an inductive sensor can of course be used instead.

The output signal of the measuring system (23, 24) is used for, among other things, to control the motor for the vertical drive of the carrier (4). The measuring system (23, 24) is connected for this purpose to an electronic unit (25) of the coordinate measuring device, to which signals from the two angle measuring systems (15, 16) and (17, 18) and signals from the incremental measuring system (13, 14), which measures the vertical displacement of the carrier (4) are also supplied. In addition, the electronic unit (25) forms, from the signals of the measuring systems (13–16, 23, 24), position coordinates for the measurement axes. These position coordinates are transmitted to a computer (26), where they are further processed in a known manner, e.g., for calculating the position of the probe ball (12) in the workpiece coordinate system.

If the probe (11) is now moved manually out of the null position of the measuring system (23, 24), the motor (27) displaces the carrier (4). Thereby, the suspension of the probe (11) is displaced in height in the same sense until the measuring system (23, 24) is again in its null position. In this manner, hardly any reaction forces arise in the z-direction when the probe moves in the course of the scanning motion. Reaction forces in the horizontal plane x, y are likewise very small, because of the easy-running joint arrangement and the extremely small mass of the movable parts (5–11).

The two shanks of the fork-shaped base (1) of the device contain bearings (39a, 39b) for a horizontal tilt shaft (19), which serves as a mounting for a carrier (20) for the workpiece table. A clamping plate (21) of the workpiece table is mounted to be rotatable about a shaft (29), in the carrier (20) and at right angles to the horizontal tilt shaft (19). A workpiece (22) clamped to the rotary tilting table constructed in this manner can be aligned in space in different positions, such that the various geometric elements to be measured by scanning are aligned with the probe axis. In order to ensure the alignment of the workpiece in all possible spatial directions, a third shaft can be provided that has a pivot axis that is aligned perpendicular to the shafts (19) and (29). This pivot axis also can be integrated into a mounting plate on which the workpiece is clamped outside the device, and which is then fastened with the workpiece to the rotary tilting table.

For example, for scanning the bore (30), the workpiece table is tilted into the position shown by broken lines, in which the axis of symmetry of the bore is aligned parallel to the long axis of the probe (11). The probe ball (12) can then be made to travel along the inner wall of the bore in constant contact with the inner wall without the probe shaft striking the wall.

The rotary tilting table (20, 21) is constructed of molded ceramic parts, which have high stability and load-carrying capacity and low thermal sensitivity.

The rotatable clamping plate (21) of the workpiece table forms straight line edges with the lower part (20) of the table and carries V-shaped grooves (31) on all four end faces. These grooves can be sensed and traveled by the probe ball (12) or by one of smaller diameter (12a), see FIG. 2a, for determining the workpiece position.

The tilt position of the table (20) can be determined when the table is tilted forwards through a relatively large angle of up to 90°. For this purpose, a pair of grooves (32) are located on the rear side of the table (20) and are easily reached by the probe (11) in the tilted position of the table.

In operation, shape tests are undertaken on a workpiece (22) in manual operation, i.e., with the manually guided probe (11), using the coordinate measuring device shown in the Figures, according to the following procedure:

The workpiece (22) is first aligned by means of the rotary tilting table with respect to its geometric elements to be measured—in this case, for example, the bore (30)—such that the bore axis is aligned approximately parallel to the long axis of the probe. For this purpose, the rotary tilting table is brought into the position shown by broken lines in FIG. 1. In this position the shafts (19) and (29) of the table are clamped by means of devices that are not illustrated in detail.

The bore (30) is then scanned, a large number of measurement values of the aforementioned measuring system being processed by the computer (26).

If additional geometrical elements that lie in other planes or on other sides of the workpiece are to be measured in relation to the bore (30), the spatial position of the rotary tilting table is then determined. For this purpose, the probe ball (12) is guided in the grooves on the clamping table (21) along at least two directions or at least two sides. The computer (26) determines from the two measured straight lines the spatial position of the plate (21) and hence of the workpiece (22).

The workpiece position is then changed by means of the rotary tilting table such that the probe (11) is perpendicular to the next measurement plane or parallel to the next bore axis. The altered position of the plate (21) is then determined anew, as described herein above. Linking up the workpiece coordinate systems in the differently tilted or rotated positions is thus ensured. This is accomplished without excessive expense for reproducibility or precise mounting of the two shafts (19) and (29) of the rotary tilting table and without additional measuring systems for determining shaft positions.

The measurement processes which have been described are thereafter repeated for geometric elements with other orientations of their axes of symmetry.

The coordinate measuring device described herein above is designed for manual operation. However, it is possible to motorize it partially or wholly. In that case, worm gears are installed on the shafts (6) and (8). Instead of the rigid probe (11), an electronic probe may be used with a stylus that can be deflected in at least two coordinates. Such probes are known per se and described for example in West German published patent application DE-OS 18 04 253 or in U.S. Pat. No. 3,149,421, the latter of which is incorporated herein by reference.

Also, instead of the angle measuring systems (15, 16) and (17, 18) for measuring the position of the probe in the horizontal plane, other measuring systems can be used: such systems, for example, that measure the position of the probe from at least two spaced-apart stationary positions. Such measuring systems are described, for example, in U.S. Pat. No. 4,961,267, which is incorporated by reference.

It is furthermore possible to build the coordinate measuring device directly onto machine tools for the production area.

I claim:

1. A coordinate measuring device comprising:
   a probe for coordinate measurement,
   said probe being mounted by means of a plurality of rotary shafts arranged one behind the other, to be easily movable in several degrees of freedom,
   a carrier for said plurality of rotary shafts, and
   motor drive means for moving said carrier in a vertical direction
   wherein, said probe is arranged to be manually deflectable in a vertical direction, and
   a workpiece table for supporting a workpiece for measurement by said probe, that is rotatable and tiltable about at least two shafts.

2. A coordinate measuring device according to claim 1, wherein said plurality of rotary shafts comprise two mutually parallel rotary shafts,
   each of said two mutually parallel rotary shafts having sensing means associated therewith for sensing rotary motion of said rotary shaft.

3. A coordinate measuring device according to claim 1, further comprising a plurality of measuring systems that measure positions of said probe from at least two stationary, spaced-apart positions.

4. A coordinate measuring device according to claim 1, further comprising a control device, and sensing means connected to said control device for sensing deflection of said probe, said motor drive means being connected to said control device, whereby manual deflection of said probe is reset by travel of said carrier driven by said motor drive means.

5. A coordinate measuring device, comprising:
   a probe for coordinate measurement,
   said probe being a rigid probe mounted by means of a plurality of rotary shafts arranged one behind the other, to be easily movable in several degrees of freedom,
   linear guiding means for displacing said rigid probe in a vertical direction, and
   a workpiece table for supporting a workpiece for measurement by said rigid probe, that is rotatable and tiltable about at least two shafts.

6. A coordinate measuring device, comprising:
   a probe for coordinate measurement,
   said probe being mounted by means of two mutually parallel rotary shafts arranged one behind the other to be movable in several degrees of freedom,
   said rotary shafts each having a vertical axis and sensing means for sensing rotary motion of said shafts around said axes,
   said probe being further mounted to be deflectable in a vertical direction,
   a carrier for said rotary shafts,
   motor drive means for moving said carrier in a vertical direction, and
   a control device and sensing means connected to said control device for sensing deflection of said probe,
   whereby deflection of said probe is reset by travel of said carrier driven by said motor drive means.

7. A coordinate measuring device according to claim 6, further comprising:
   a workpiece table for supporting a workpiece for measurement by said probe, which workpiece table is rotatable and tiltable about at least two shafts.

8. A coordinate measuring device according to claim 6, wherein said probe comprises a rigid probe, further comprising linear guiding means for displacing said rigid probe in said vertical direction.

9. A coordinate measuring device according to claim 6, wherein said probe comprises an electronic probe having a deflectable stylus.

10. A coordinate measuring device according to claim 7, wherein said workpiece table comprises centering elements that are arranged to be sensed by said probe.

11. A coordinate measuring device according to claim 6, further comprising a first movable lever member connected to a first and a second of said two mutually parallel rotary shafts, and a second movable lever member connected to said second of said rotary shafts and said probe, said first and second movable lever members and said probe being composed at least partially of materials selected from the group consisting of carbon fiber reinforced plastic and invar.

12. A coordinate measuring device according to claim 7, wherein said workpiece table comprises ceramic molded parts.

13. A coordinate measuring device according to claim 6, wherein said probe has a longitudinal axis that is aligned approximately parallel to said two mutually parallel rotary shafts.

* * * * *